Nov. 25, 1952     H. EMOND     2,619,126
DOUBLE ACTION LETOFF
Filed Jan. 8, 1951
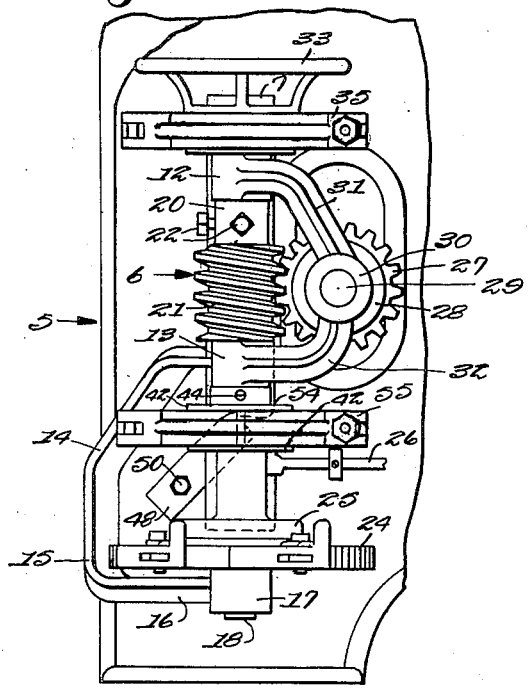
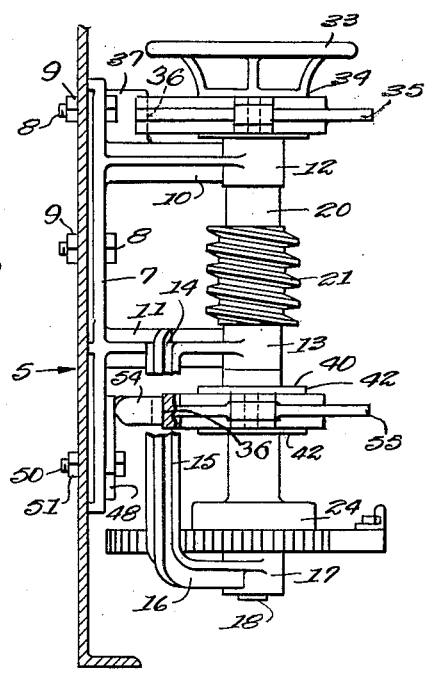
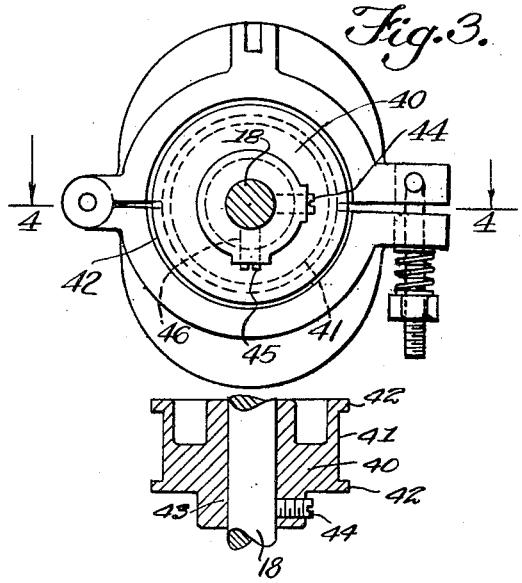
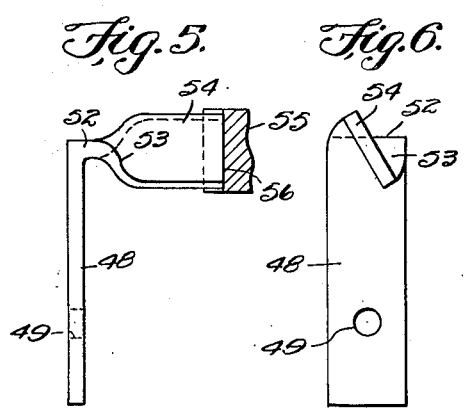
INVENTOR.
*Hector Emond,*
BY *Victor J. Evans & Co.*
ATTORNEYS Patented Nov. 25, 1952

2,619,126

UNITED STATES PATENT OFFICE 2,619,126

DOUBLE ACTION LETOFF

Hector Emond, Suncook, N. H.

Application January 8, 1951, Serial No. 204,905

2 Claims. (Cl. 139—108)

The present invention relates to improvements in let-off mechanisms for looms, and more particularly to a novel braking or friction element for controlling the let-off mechanism drive shaft.

One object of the invention is to provide a let-off mechanism of the Bartlett type for looms having a friction braking element arranged between the drive worm and ratchet mechanism in addition to the conventional friction element to control the let-off drive shaft uniformly and increase the accuracy of the let-off mechanism.

Another object is to provide a let-off mechanism for looms with a friction braking element for controlling rotation of the drive shaft which will enable the shaft to be rotated uniformly and evenly by the lay and ratchet mechanism to thus impart uniform motion to the warp beam of the loom.

Another object is to provide a let-off mechanism for looms with dual braking elements arranged such as to balance out vibrations and to afford the let-off mechanism with a nicety of control.

Another object is to provide a let-off mechanism for looms in which the friction collars are floatingly mounted with one friction element or brake mounted above the drive worm on the let-off shaft and the other friction element mounted therebelow which will maintain the let-off shaft under a constant drag at both ends of the worm so that one end will not have a tendency to move within the limits of the bearing play creating backlash.

Another object is to provide a let-off mechanism which will stop uneven weave caused by irregular motion imparted to the warp beam during the let-off stroke or movement when weaving various types of cloth such as cotton and rayon. Thus, the efficiency of the loom is increased and the fabric weave is enhanced.

Other objects and advantages of the invention will become apparent during the course of the following description of the accompanying drawing, wherein—

Figure 1 is a front elevational view of a Bartlett type let-off mechanism showing the friction brake element arranged between the drive worm and ratchet mechanism.

Figure 2 is a side elevational view showing a portion of the loom in section and parts of the let-off mechanism broken away to illustrate various structural details.

Figure 3 is a top elevational view of the collar or friction brake drum which is mounted on the let-off drive shaft between the drive worm and ratchet mechanism.

Figure 4 is a diametrical cross-sectional view taken on line 4—4 of Figure 3 and looking in the direction of the arrows to illustrate the manner in which the friction drum is secured to the drive shaft.

Figure 5 is an edge elevational view of the friction collar retaining bracket which is adapted to be bolted to the loom side with its end presented to the friction collar, and Figure 6 is a front elevational view of the same.

In the drawing, and more in detail, attention is first directed to Figures 1 and 2 wherein there is shown for the purpose of convenience of illustration a loom frame generally designated 5 to which is applied a Bartlett type let-off mechanism which is provided for controlling the warp beam in accordance with the loom mechanism. The let-off mechanism being controlled usually from the lay sword through suitable linkage. This type of let-off mechanism is employed for placing the warp beam under constant tension and is shown in U. S. Patent 2,350,954.

The let-off mechanism 6 includes a bracket plate 7 which is affixed to the loom side by bolts 8 secured in place by nuts 9. A pair of spaced bracket arms 10 and 11 are integrated with the bracket plate, and are provided on their free ends with bearing collars or bosses 12 and 13 respectively. Formed integral with the bracket arm 11 is an offset arm 14 having a downwardly extending portion 15 angularly bent at its lower end to form a horizontal arm 16. The horizontal end 16 terminates in a bearing boss 17 in vertical alinement with the bearing bosses 12 and 13.

Rotatably mounted in the alined bearing bosses 12, 13 and 17 is a let-off drive shaft 18 to which is affixed the hub 20 of a worm 21. Set screws 22 are received in correspondingly threaded openings in the hub 20 for locking the worm to the shaft. The lower end of the shaft 18 is fitted with a ratchet 24 which has its hub likewise secured to the shaft and rotatably mounted above the ratchet is a ratchet pawl carrier 25 to which is pivoted a lay control link 26.

The worm 21 is arranged in driving engagement with a worm wheel 27 (Fig. 1) which has its hub 28 secured to a drive shaft 29, which drive shaft is provided with a spur gear for drivingly engaging the ring gear on the warp beam (not shown), and the shaft 29 is supported in a bearing boss 30 integrated with arms 31 and 32, the other ends of which are integrated with the bearing bosses 12 and 13 respectively.

The upper end of the shaft 18 is provided with a hand wheel 33 having a grooved hub 34 surrounded by a hinged friction brake element 35 as usual. A recess 36 is formed in the peripheral surface of the brake element 35 for receiving the outer edge of the re-inforcing web 37 on the bracket plate 7. The brake collar 35' includes a pair of hingedly connected sections with their free ends yieldingly urged together by means of a spring and bolt connection and the inner peripheral surface of each of the brake sections 35' is provided with friction surfaces which are arranged to frictionally engage the collar 34 of the handle 33.

Mounted between the pawl carrier 25 and worm 21 is a drum 40 having an annular channelway 41 in its peripheral surface forming opposed rim flanges 42. The hub 43 of the drum 40 is provided with a set screw 44 which is adapted to lock the drum 40 on the shaft 18 (Fig. 4). A second set screw 45 is received in a correspondingly threaded opening 46 in the hub 43 and is arranged at right angles to the set screw 44 to enable the drum 40 to be centered and completely balanced.

Mounted on the loom side is a bracket arm 48 which has an opening 49 for receiving a bolt 50 which extends through an opening in the loom side 5 and is held in place by a retaining nut 51. The upper end of the bracket 48 is angularly bent as at 52 and is spirally twisted as at 53 through an angle slightly greater than 45 degrees to provide a flat outwardly extending portion 54. The bracket arm is adapted to be bolted to the loom side as shown in Figure 1 at an angle of approximately 45 degrees so that the flat end portion 54 will extend in a vertical plane parallel with the axis of the let-off drive shaft 18. Surrounding the drum 40 is a brake collar 55 which is formed in identically the same manner as the brake collar 35' and includes a pair of hingedly connected semi-circular sections having their free ends yieldingly connected by means of a bolt extending through suitable lugs with a coil spring encircling the bolt and one end abutting the end of the bolt, and the other engaging one of the flanges to yieldingly urge the hinged sections of the brake collar 55 together. The internal surfaces of the semi-circular brake collar sections are provided with a friction element which is received between the rim flanges 42 within the annular recess or groove 41. Thus, the collar is supported against axial movement and in order to prevent rotation thereof the peripheral surface of one of the collar sections is provided with a radial recess 56 for receiving the flat vertical end 54 of the bracket 48.

In operation, the linkage 26 controlled by the lay sword (not shown) oscillates the pawl carrier 25 which imparts a corresponding motion to the ratchet wheel 24 which drives the shaft 18. The worm 21 thus rotates the warp beam through the worm wheel 27 and the spur gear on the drive shaft 29. When the collars 35' and 55 are adjusted to provide the desired friction between the collars and the drums 34 and 40, the shaft 18 will be rotated under constant friction and hence, the warp beam will be correspondingly tensioned such that the let-off will be uniform and the quality of the cloth produced will be greatly increased and enhanced.

I claim:

1. In a loom let-off, a let-off drive shaft, ratchet mechanism for intermittently rotating said shaft on the lower end thereof, a worm secured to the let-off drive shaft spaced above said ratchet mechanism, a drum having its hub secured to said shaft between the ratchet mechanism and said worm, a friction brake collar surrounding said drum and in yielding engagement therewith, a recess in said collar and a bracket secured to the loom side having an angular end portion received in the recess in said collar.

2. In a loom let-off, a let-off drive shaft, ratchet mechanism for rotating said shaft on the lower end thereof, a worm secured to the let-off drive shaft spaced above said ratchet mechanism for driving the warp beam of the loom, a drum having its hub secured to the let-off drive shaft and arranged between the ratchet mechanism and said worm, a friction brake collar surrounding said drum and including hingedly connected sections yieldingly urged together to exert friction force on said drum, a recess in the peripheral portion of one of the brake collar sections and a bracket affixed to the loom side having an angular upper end spirally twisted to provide a flat vertically extending detent adapted to be received in the recess in the peripheral portion of one of the brake collar sections.

HECTOR EMOND.

REFERENCES CITED

The following references are of record in the file of this patent:

UNITED STATES PATENTS

| Number | Name | Date |
|---|---|---|
| A.I.176 | Snell et al. | Oct. 6, 1857 |
| 222,886 | Flanagin et al. | Dec. 23, 1879 |
| 264,864 | Crompton et al. | Sept. 26, 1882 |
| 266,351 | Crompton et al. | Oct. 24, 1882 |
| 436,724 | Robinson | Sept. 16, 1890 |
| 2,350,954 | Brown | June 6, 1944 |